US005647720A

United States Patent [19]
Golicz et al.

[11] Patent Number: 5,647,720
[45] Date of Patent: Jul. 15, 1997

[54] HAND CART FOR TRANSPORTING STACKED ARTICLES

[75] Inventors: Stefan G. Golicz, Essex; Roman M. Golicz, Clinton, both of Conn.

[73] Assignee: Documotion, Inc., Old Saybrook, Conn.

[21] Appl. No.: 523,221

[22] Filed: Sep. 5, 1995

[51] Int. Cl.⁶ ........................................ B66F 9/00
[52] U.S. Cl. .................... 414/490; 414/924; 414/926; 414/923; 414/796.7; 414/595; 414/788.9; 414/444; 187/233; 280/47.2
[58] Field of Search ..................... 414/444, 595, 414/592, 602, 604, 605, 796.7, 786, 490, 923, 924, 925, 926, 788.9; 187/233, 267, 245; 254/7 R, 7 C, 5 R, 5 C, 88; 280/47.24, 47.16, 47.2

[56] References Cited

U.S. PATENT DOCUMENTS

| | | | |
|---|---|---|---|
| 2,514,563 | 7/1950 | Todd | 187/233 |
| 2,514,825 | 7/1950 | Zenko | 414/595 X |
| 2,653,679 | 9/1953 | Hamilton, Jr. | 414/926 X |
| 2,786,692 | 3/1957 | Timpson | 280/47.2 X |
| 3,123,829 | 3/1964 | Bronson | 414/924 X |
| 4,861,213 | 8/1989 | Fuchs | 414/923 X |
| 4,921,388 | 5/1990 | Nelson | 414/796.7 X |
| 5,135,352 | 8/1992 | Scata et al. | 414/926 X |

FOREIGN PATENT DOCUMENTS

| | | | |
|---|---|---|---|
| 251535 | 11/1987 | Germany | 414/923 |
| 635409 | 3/1962 | Italy | 414/444 |
| 55022 | 3/1986 | Japan | 414/923 |
| 630551 | 10/1949 | United Kingdom | 280/47.2 |

Primary Examiner—Frank E. Werner
Attorney, Agent, or Firm—C. G. Nessler

[57] ABSTRACT

A hand cart for carrying sheets and other stacked objects has a motorized self-leveling platform, so the things being carried are kept at a constant elevation convenient to a worker, whether things are being added or removed from the platform. For carrying sheets, such as moving sheets of paper in document processing operations, the cart upright and platform are tilted, and the upright has opposing wings extending at 90 degree. Thus, sheets tend to move against the wings and their alignment is either obtained or maintained. When the cart is tilted to move it about, the cart design and load positioning system desirably keep the upward force which a worker must apply to the cart handle at low levels.

16 Claims, 3 Drawing Sheets

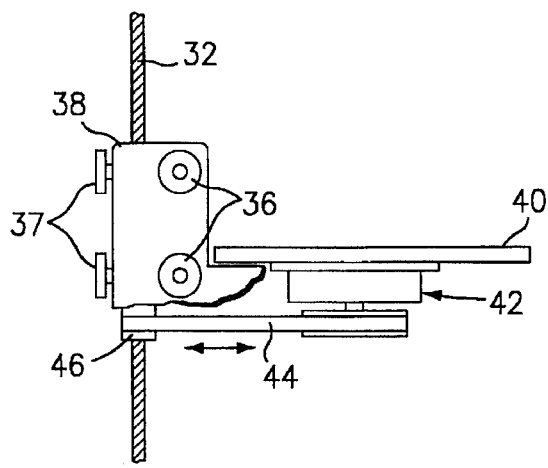
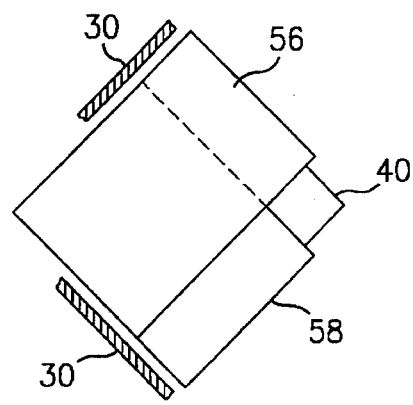
FIG. 3
FIG. 4
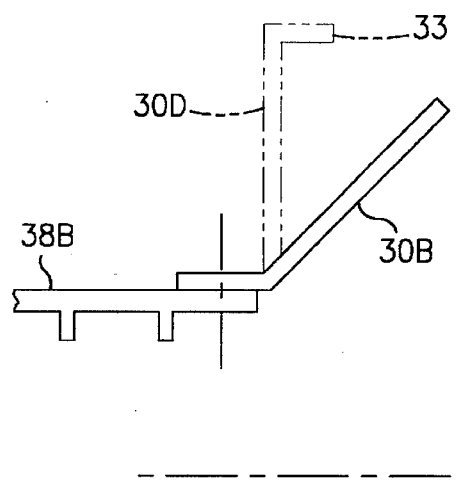
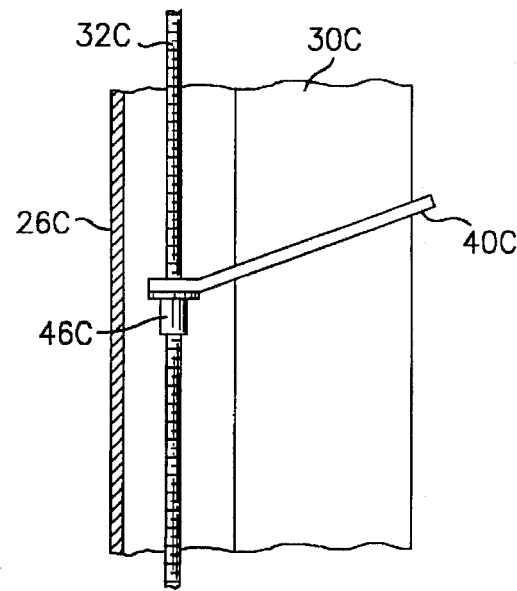
FIG. 5
FIG. 7

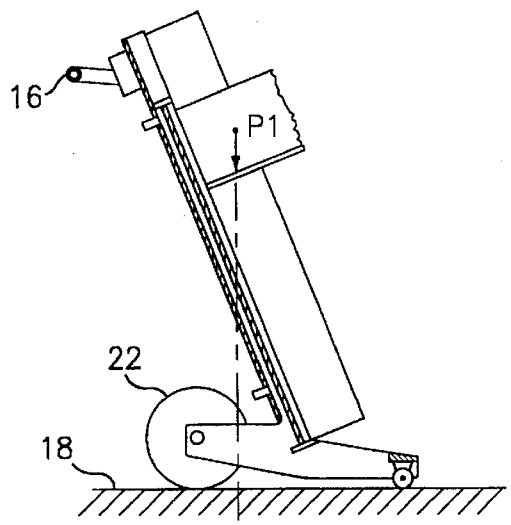
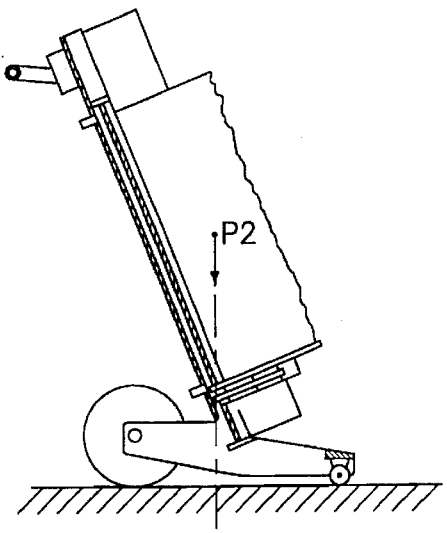
FIG. 6A  FIG. 6B
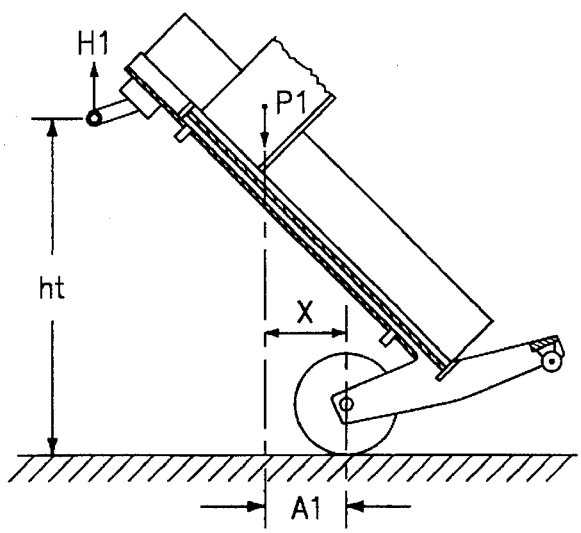
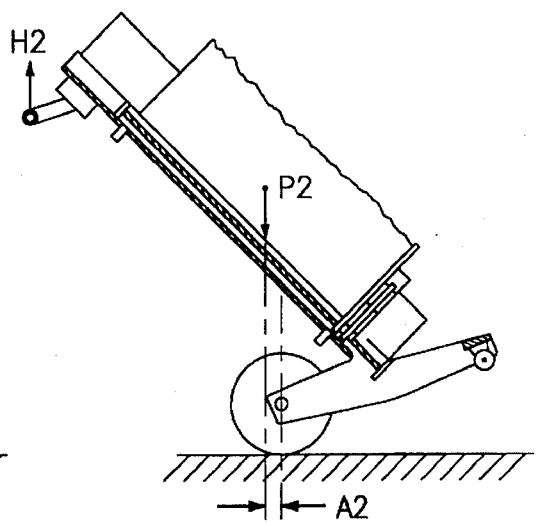
FIG. 6C  FIG. 6D

HAND CART FOR TRANSPORTING STACKED ARTICLES

FIELD OF INVENTION

The present invention relates to material handling devices, in particular, to carts for receiving, transporting and discharging sheets, especially sheets of papers during documents processing operations, such as printing, finishing, binding, etc.

BACKGROUND

In modern printing operations, high speed printers are used to print fan folded or single sheets of paper, typically 8.5×11 inch in dimension. Frequently, the sheets are then further processed, by folding, stapling, binding or inserting them into documents in finishing equipment. Since printers tend to have much lower sheet output rates than finishing machines, several printers may be used to feed one finisher.

Usually a worker will remove the printed sheets issuing from the printer and pile them onto a dolly or rack which is then moved to the vicinity of the input zone of the finishing unit. Typically, tens of thousands of pages are involved, and for efficiency the transport rack or cart is piled high with pages. To have good capacity, the level of the transport cart platform tends to be near the floor. As a result the worker must at times lift heavy stacks from almost the floor level. Not only does this increase effort on the part of the worker, but it increases the chance of the worker dropping papers or suffering injury from improper lifting. Another problem with present day carts is that during moving, loading or unloading, the sheets will sometimes either fall off the cart or otherwise become slightly or greatly disordered relative to one another. Consequently, there is a need for improvements in such handling of papers and other things which present similar problems.

SUMMARY

An object of the invention is to move stacks of sheets and other articles easily while preserving their relationship to each other. Another object is to provide a means for moving sheets of papers and other things which is easy and convenient for a worker, minimizing the amount of lifting.

In accord with the invention, a cart has an upright mounted on a base, and a platform for receiving objects translates along the length of the upright to different elevations. A motor drive and control system automatically maintain the top of the platform or the top of any objects on the platform at a desired elevation near the upper end of the upright. Preferably, the drive system is electrically powered from a battery; and, the motor is mounted on the movable platform, to drive a nut mounted on a fixed screw lying along the upright.

Further in accord with the invention, a cart has an upright which is inclined at an angle to the floor, mounted on the base, and a platform which translates along the length of the upright to different elevations. The platform has a surface extending normal to the length of the upright; thus, it is inclined. Wings are positioned on either side of the upright along the length of, and proximate to, the path of platform travel. Thus, when paper sheets or other objects are placed on the platform, and when there is any motion imparted to the sheets, such as during moving of the cart from one location to another, the things on the platform are urged toward the wings by the resolved vector of gravitational force; and, they are maintained in, or tend to be put into, alignment relative to one another, by the wings. Preferably, the upright is positioned at a 60–70 degree angle to the floor on which the base travels.

Further in accord with the invention, when a cart is tilted to move the cart about, owing to the automatic load positioning feature, the extent of rearward movement of the gravitational force vector of the load on the platform is less for heavy platform loads than it is for lighter loads. As a result, the upward force a worker must exert to hold the cart handle up increases proportionately less with load increase than would otherwise be the case. As a result moving of the cart is made easier.

The foregoing and other objects, features and advantages of the invention will become more apparent from the following description of the best mode of the invention and accompanying drawings.

BRIEF DESCRIPTION OF THE DRAWINGS

FIG. 3 is a side view of the platform bracket, platform and motor.

FIG. 4 is a fragmentary lengthwise and downward view along the upright of a cart, showing how offset stacks of papers mount on the platform between opposing wings.

FIG. 5 is a fragmentary cross section view of part of an upright showing a removable 45 degree wing and a 90 degree wing in phantom.

FIG. 6A and 6B are similar, showing in side elevation two carts, one having a small load and the other having a larger load, to illustrate the position of the vector of static downward force from the load.

FIG. 6C and 6D correspond respectively with FIG. 6A and 6B, showing the same carts and loads with carts in tilted position for manual moving, to illustrate the forces which maintain the carts' equilibrium and to compare how the vector positions change differently according to the load on the cart.

FIG. 7 is a fragmentary side elevation view like that of FIG. 1, showing a vertical upright and tilted platform.

DESCRIPTION

The cart embodying the preferred practice of the invention is moved manually along a flat floor, while the movable platform which receives sheets of paper is powered. To reduce weight, the major components of the cart are preferably made of aluminum, although alternate materials may be used. While the present invention is described in terms of sheets of papers as they might be handled in processing of documents, it will be understood that the invention will be applicable to the handling of other things in other environments.

Figure 1:
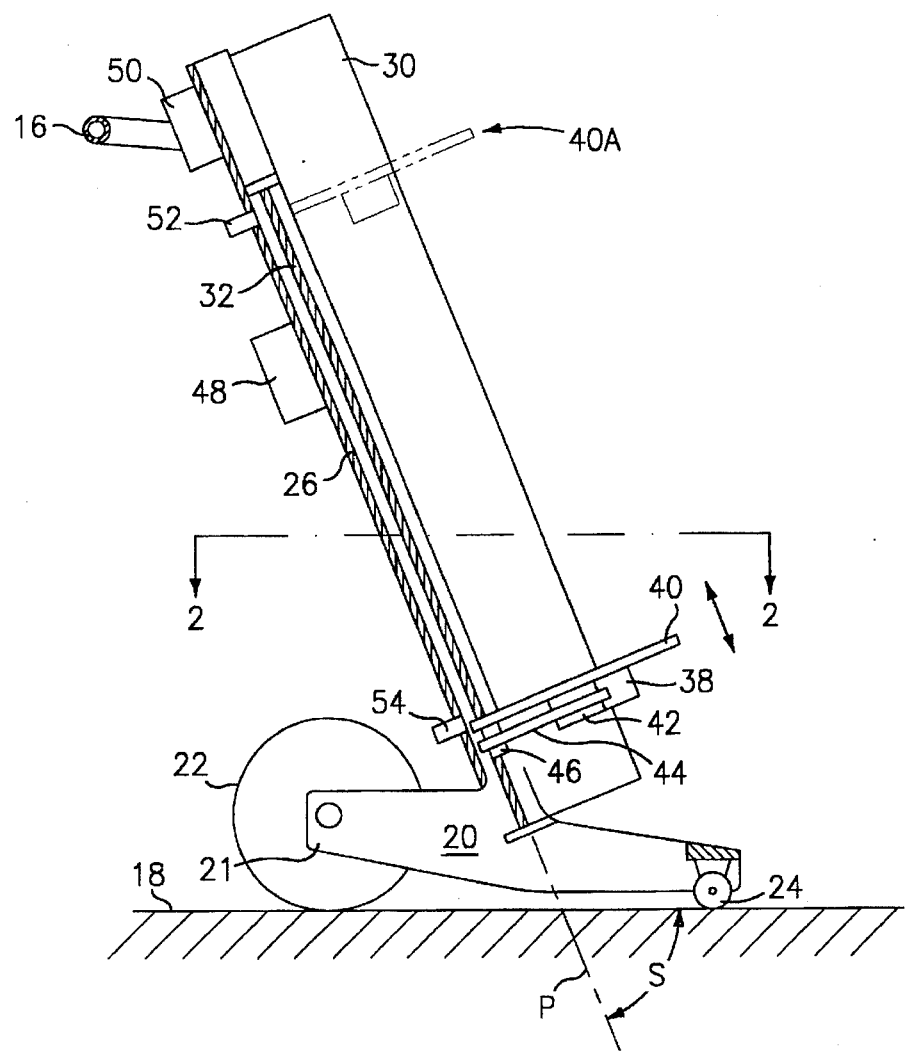
FIG. 1 shows a cart in vertical elevation and partial cut away.
Figure 2:
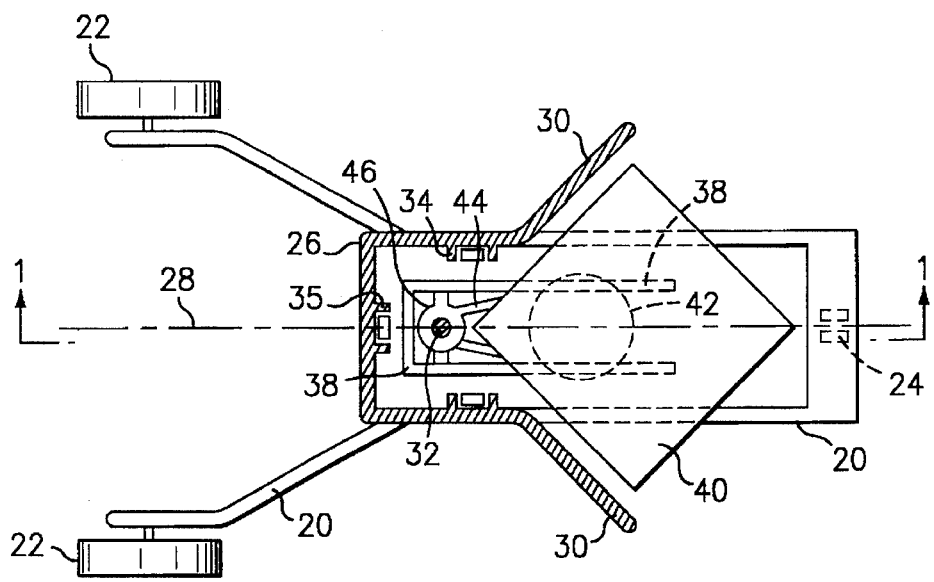
FIG. 2 shows a cross sectional plane through a cart like that shown in FIG. 1.

FIG. 1 shows a preferred embodiment of the invention in side elevation, with some parts nearest the viewer removed. FIG. 2 shows a cross section through a cart identical to that of FIG. 1. FIG. 3 shows some details of the platform and bracket not shown in the other Figures for clarity. With reference to the Figures, the cart has a base 20 with wheels at three locations. Two 10 inch diameter pneumatic tires 22 are located at the rear end 21 of the base and one smaller 2 inch diameter caster 24 is located at the front of the base. The caster preferably swivels and is comprised of two or more wheels mounted on the same axis. The wheels enable the cart to translate over the surface of the floor 18.

Upright 26 is fixed to and runs upwardly from the base. The upright is inclined at an angle, with the top tilted toward the rear end of the base. The extension of the lengthwise axis of the upright intersects the floor at point P, forming an angle S with the floor. Angle S is most preferably about 67 degrees, and more preferably between 60–70 degrees.

Opposing wings 30 are attached along the length of the upright 26, projecting at 45 degree angles from the vertical centerplane 28 running through the longitudinal axis of the upright. See FIG. 2. The wings form a 90 degree included angle in the cross section plane normal to the upright length. Handle 16 is attached to the upper end of the upright; it enables a worker to grab, tilt and move the cart as described below. Also attached proximate the handle is control box 50, described below.

The upright has a fixed screw 32 mounted between brackets at either end of the upright. Upright 26 is generally a u-shape extrusion, as shown in the cross section in FIG. 2. The upright has opposing channels 34 and rear channel 35, running lengthwise. Side guide rollers 36 and rear guide rollers 37 fit into and run along the channels, to guide the path of the bracket. Platform 40 is fastened to the platform bracket 38 and is contained within the 90 degree angle of the opposing wings. FIG. 3 shows a pancake motor 42 having a timing gear pulley, mounted on the underside of the platform. A belt 44 on the motor pulley drives a rotatable nut 46 which is attached to the platform bracket. Thus, when the motor is energized, the nut rotates and the bracket and platform are drawn up or down along the length of the upright. The arrangement avoids the need for a rotating screw heavy enough to resist whipping; and the pancake motor and nut at the platform avoid weight which would be present at the upper end of the upright, if a motor driving the screw was placed there.

FIG. 3 shows how guide rollers 36, 37 are attached to the platform bracket 38. They make the bracket and attached platform move true and evenly along the path of the channelled upright, regardless of load distribution on the platform. In FIG. 3 the part of the bracket 38 on which the platform 40 is mounted is partially cut away to reveal the motor 42 and pulley 44 which it protects.

Referring to FIG. 1, the platform 40 is adapted to move up and down on the upright as indicated by the double headed arrow. Preferably, the motor 42 is a direct current reversible motor powered by a replaceable battery 48 mounted on the upright below the control box. Of course, other power sources may be used in substitution for, or in combination with, a battery. The electrical connections of the cat motor and control system will be evident from this description. Preferably, the battery is connected to the control box by a quick disconnect power cord. The control box contains switches and the pancake motor control circuitry. The switches enable the device to be set for automatic or manual mode.

When in manual mode, actuation of the motor controls on the control box positions the platform at the desired elevation. When in automatic mode, the platform automatically moves vertically to nearly the top of the upright, as illustrated by the phantom lines 40A in FIG. 1. The topmost position of the platform is controlled by a signal from the sensor 52. The sensor detects the presence or absence of any object on the platform, or the platform itself, using such as optical means. Likewise, sensor 54 at the lower end of the upright is used to limit the lowermost position of the platform.

In use with the automatic mode, the control system is configured so that the top of the platform, or any object such as a stack of paper mounted on the platform, rises to a position indicated by the phantom lines 40A in FIG. 1. When the platform is at its uppermost position and papers are placed on the surface of the platform, their presence or height above the desired uppermost limit is detected by sensor 52. The control circuitry in box 50 responds to the signal, whereupon the motor is actuated to make the platform descend. Conversely, when there is a stack of papers on the platform and some are removed by a worker, the control system raises the platform a distance essentially equal to the height of the stack portion which was removed. Thus, the top of any stack of papers which rests on the platform of the cart will stay at an essentially constant elevation above the floor, as determined by the position of upper sensor 52. This makes it convenient for workers to load and unload the platform. To facilitate productivity, the drive system preferably will move the platform along the upright at about 1.3 inch per second.

Because the platform slopes at a preferred angle of about 23 degrees, gravitational force on the load is channelled, or resolved, urging the sheets to move toward the upright and adjacent 90 degree angled wings. This is especially so when there is any vibration or shaking, as may occur during moving of the cart. Thus, the sheets will be maintained in, or brought into, alignment and justification; even more so, when the cart is tilted rearward for transport to another location. The top view fragment of FIG. 4 shows how offset lifts of sheets 56, 58, will be also maintained in relative alignment by the cart design. For any instances where sheets or other objects have other than 90 degree corners, or other shapes, the wing angle and shape would be appropriately adjusted.

In the generality of the invention the upright may be vertical and only the platform 40C tilted, as shown by the cart fragment of FIG. 7. (In the Figures, numbers with suffixes indicate parts which correspond with those previously described for the same number.) In the embodiment of FIG. 7, the opposing wings will be made to have an included angle of greater than 90 degrees (measured normal to the upright length) so that the included angle measured in the plane of the platform surface will be 90 degrees, to fit sheets with square corners. Appropriate change in configuration of the pancake motor and nut drive system will be made to accomodate the non-normal angle between the platform underside and the screw.

Also in the generality of the invention, the upright may extend vertically from the base, i.e., normal to the floor, and the platform may be level. While the inherent gravitationally induced sheet justifying feature of the sloped platform will not be operative when the cart is stationary, it will be operative during transport, when the cart is tilted. And, the other features described herein will be present.

As shown in FIG. 5 the wing 30 is desirably bolted to the upright 38 for fabrication purposes and for enabling easy change of the angle of the wings. As an example, FIG. 5 shows by phantom lines how wing 30D can replace wing 30B, to provide an essentially planar wing surface with small outer tabs 33, limiting lateral motion. Similarly, the platform 40 is replaceable to provide other platform shapes and surface features, within the general principles of the invention. While the rotating pulley driven nut is preferred, other drive systems, e.g., a worm drive, may be used to move the platform.

FIG. 6A–D are like FIG. 1 and illustrate how the cart is configured for desirable management of forces, both when it is at rest (e.g., during loading, unloading, or storage) and when it is being moved, (e.g., when the cart and sheets it is carrying are being moved to another location). In the rest position, illustrated by FIG. 6A and 6B, the handle 16 is nominally 48 inch from the floor 18. FIG. 6A shows a cart holding a relatively small load of sheets, which might weigh about 40 pounds, while FIG. 6B shows the same cart with a larger and heavier load, which might weigh 120 pounds. For both loads, the control system positions the top of the load at the same elevation near the top of the upright. And, in both instances the vertical line of gravitationally induced force due to the mass of the papers, indicated by vectors P1 and P2, passes between the axes of the rear wheels and the front caster, albeit at slightly different horizontal locations.

FIGS. 6C and 6D correspond respectively with FIGS. 6A and 6B. They show how, to move the cart to a new location, the cart is manually tilted so the device rotates about the axis of the rear wheels, and the upright moves to about a 45 degree angle to the floor. In this position, the handle 16 is desirably lowered to an elevation ht of about 32–34 inches from the floor. Such elevation might be typical of the elevation of the hand of a worker's extended arm when moving a cart. When the cart is tilted, the vertical lines of action of the gravitationally induced forces, indicated by vectors P1, P2, move rearward to a position which is a distance A1, A2 rearward of the axis of the rear wheels. Thus, the worker necessarily exerts vertical upward force H1, H2 to maintain the cart in equilibrium. Generally, it is desirable that there be required a force H1, H2, since in the absence of such controlling mobility of the cart is difficult. On the other hand, too great a force H1, H2 might be difficult for the worker to handle.

The configuration and spatial relationships of the parts of the cart provide a desirable situation during tilting. In particular, the position of the rear wheels relative to the upright, the angle S, and the regions along the length of the upright where the platform is permitted to travel, combine to keep the worker force H1, H2 within desirable limits, whether the load is light or heavy. From the FIGS. 6C and 6D, it is seen that, upon tilting, the line of action of the forces P1, P2 intersect the horizontal plane of the floor a distance x, shown as A1, A2, from the vertical plane 60 passing through the axis of the wheels. And, when there is a large sheet load on the platform, the distance x (A2) is less than the corresponding distance x (A1) for the lighter load. Thus, increasing the load decreases the moment arm x (A1, A2) of the load being carried, and mitigates the increase in handle load. With a preferred configuration, the load H1, H2 does not exceed about 30 pounds even when handling conventional 8.5×11 inch sheet paper loads up to 120 pounds.

To facilitate tilting and precise location at the delivery point, one or more of the rear wheels is preferably fitted with a manual brake which can be energized to prevent unwanted rearward or forward motion.

Although only the preferred embodiment has been described with some alternatives, it will be understood that further changes in form and detail may be made without departing from the spirit and scope of the claimed invention.

We claim:

1. A device for receiving, transporting and unloading stacked sheets, which comprises:

a base for supporting the device on a horizontal plane, the base having a front end and a rear end;

means for translating the device across the plane to a desired location, attached to the base;

an upright attached to the base and projecting upwardly therefrom, the upright having a length and a vertical centerplane;

a cantilevered platform projecting in the direction of said vertical centerplane, movably mounted on the upright to travel along a path to different elevations along the length of the upright, the platform having a surface running upwardly from the vicinity of the upright, for receiving and supporting the stacked sheets;

two cantilever wings, attached to the upright and running along the travel path of the platform, one wing disposed on either side of said vertical centerplane, to define a space therebetween;

the platform surface shaped to approximately fit within said space between said two cantilever wings while the platform moves along said path; wherein sheets placed on the platform surface tend to move by gravitational force down the slope of the surface and toward the upright, to contact the wings and thereby be aligned with each other; and means for automatically moving the platform to a desired elevation along the length of the upright, the means responsive to the height of the top of sheets resting on the platform, so said top is maintained at a constant elevation with respect to the base when the height of sheets on the platform is changed.

2. The device of claim 1 characterized by said wings extending at a 45 degree angle to the vertical centerplane of the upright, the wings forming a 90 degree included angle within which the platform is contained.

3. The device of claim 1 wherein the means for automatically moving the platform to a desired elevation along the length of the upright is comprised of a motor, mounted on the platform;

a screw, fixedly mounted along the length of the upright; and, a rotatable nut, driven by the motor, mounted on the screw and attached to the platform;

wherein, rotation of the nut by the motor translates the nut and attached platform along the length of the upright.

4. The device of claim 1 further comprising means for manually pulling the top of the upright laterally, attached to the upper end of the upright, to enable manual tilting of the upright and attached base relative to their respective rest positions, to cause rotation thereof; and, means for translating which includes at least two spaced apart wheels mounted along an axis, attached to the rear end of the base, wherein said axis is positioned rearward of the intersection of an extension of the length axis of the upright with said horizontal plane;

wherein, manual tilting of the upright rotates the device about said wheel axis.

5. The device of claim 4 further comprising a stack of sheets resting on the platform surface, said stack having a center of mass, said stack subject to downward gravitational force represented in direction and amount by a vector passing through said center;

wherein said vector passes through a region forward of said wheel axis, when the base of the device is in its rest position on the horizontal plane;

wherein, when the upright is tilted manually to a sufficient given angle, the vector intersects the horizontal plane a distance x rearward of said wheel axis; and, wherein said distance x automatically decreases when the height of the stack of sheets is increased.

6. A device for receiving, transporting and unloading objects which comprises:

a base for supporting the device on a horizontal plane, the base having a front end and a rear end;

means for translating the device across the plane to a desired location, attached to the base;

an upright, attached to the base and projecting upwardly therefrom, the upright having a length inclined relative to the horizontal plane, the upright having a top tilted in the direction of the rear end of the base;

a platform, movably mounted on the upright and adapted to travel along a path to different elevations along the length of the upright, the platform having a surface for receiving and supporting the objects, the platform surface extending perpendicular to the upright in a direction opposite to the direction in which the upright length is inclined and, two opposing wings, attached to the upright and running along the length of the upright, the wings cantilevered from the upright and extending laterally, adjacent the travel path of the platform to define a space therebetween;

the platform surface fitting approximately in said space between the opposing wings; wherein, objects placed on the surface of the platform tend to move under gravitational force toward the upright and the wings, to contact the wings and thereby be aligned as the platform moves along said path.

7. The device of claim 6 characterized by each wing extending at a 45 degree angle to a vertical centerplane of the upright, the wings forming a 90 degree included angle within which the platform is contained.

8. The device of claim 6 further comprising:

means for automatically moving the platform to a desired elevation along the length of the upright, the means responsive to the elevation of the top of any objects on the platform, so said top is maintained at a constant elevation with respect to the base when the height of objects on the platform is changed.

9. The device of claim 6 characterized by the upright having an angle S to the horizontal plane of 60 to 70 degrees.

10. The device of claim 9 wherein the angle S of the upright is about 67 degrees and the platform surface lies at an angle of about 23 degrees to the horizontal plane.

11. The device of claim 6 wherein the means for moving the platform to a desired elevation along the length of the upright is comprised of a motor, mounted on the platform;

a screw, fixedly mounted along the length of the upright; and, a rotatable nut, driven by the motor, mounted on the screw and attached to the platform;

wherein, rotation of the nut causes the platform to move along the length of the upright.

12. The device of claim 6 further comprising means for manually pulling the top of the upright laterally, attached to the upright, to enable manual tilting of the upright and attached base from their respective rest positions, to cause rotation thereof; and, means for translating which includes at least two spaced apart wheels mounted along an axis, attached to the rear end of the base, wherein said axis is positioned rearward of the intersection of the length axis of the upright with said horizontal plane;

wherein, manual tilting of the upright rotates the device about said wheel axis.

13. The device of claim 12 further comprising a caster mounted at the the front end of the base.

14. A device for receiving, transporting and unloading sheets, which comprises:

a base for supporting the device on a floor, the base having a front end and a rear end;

at least two spaced apart wheels mounted on an axis at the rear end of the base, for translating the device across the floor to a desired location;

an upright attached to the base, projecting upwardly therefrom at an inclined angle to the floor, the upright having a top tilted in the direction of the rear end of the base;

a platform for receiving and supporting the objects, the platform movably mounted on the upright and adapted to travel along a path to different elevations along the length of the upright, the platform having a surface extending perpendicular to the upright in the direction of the front end of the base, the surface of the platform inclined at an angle to the floor so that sheets lying on the platform surface tend to slide toward the upright;

two opposing wings, attached to the upright and running along the length of the upright, the wings cantilevered from the upright and extending laterally, the wings located adjacent the travel path of the platform to define a space therebetween and to contact sheets lying on the platform surface and tending to move toward the upright, for controlling the alignment of sheets placed on the platform surface;

the platform surface shaped to approximately fit the space between the wings; and, means for automatically moving the platform to a desired elevation along the length of the upright, the means responsive to the height of the top of any objects on the platform, so said top is maintained at a constant elevation with respect to the base when the height of objects on the platform is changed.

15. The device of claim 14 having each wing at a 45 degree angle to a vertical centerplane of the upright, the wings forming a 90 degree included angle within which the platform is contained.

16. The device of claim 14 further comprising a stack of sheets resting on the platform surface, said stack having a center of mass, said stack subject to downward gravitational force represented in direction and amount by a vector passing through said center;

wherein said vector passes through a region forward of said wheel axis, when the base of the device is in its rest position on the horizontal plane;

wherein, when the upright is tilted manually to a sufficient given angle, the vector intersects the horizontal plane a distance x rearward of said wheel axis; and, wherein said distance x decreases when the height of the stack of sheets is increased.

* * * * *